(12) United States Patent
Alexander et al.

(10) Patent No.: US 9,971,601 B2
(45) Date of Patent: May 15, 2018

(54) DYNAMIC ASSIGNMENT ACROSS DISPATCH PIPES OF SOURCE PORTS TO BE USED TO OBTAIN INDICATION OF PHYSICAL REGISTERS

(71) Applicant: INTERNATIONAL BUSINESS MACHINES CORPORATION, Armonk, NY (US)

(72) Inventors: Gregory W. Alexander, Pflugerville, TX (US); Brian D. Barrick, Pflugerville, TX (US); Fadi Y. Busaba, Poughkeepsie, NY (US); Wen H. Li, Poughkeepsie, NY (US); Edward T. Malley, New Rochelle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 14/621,564

(22) Filed: Feb. 13, 2015

(65) Prior Publication Data
US 2016/0239306 A1 Aug. 18, 2016

(51) Int. Cl.
G06F 9/38 (2006.01)
G06F 9/30 (2018.01)
G06F 9/455 (2018.01)

(52) U.S. Cl.
CPC .......... *G06F 9/384* (2013.01); *G06F 9/30138* (2013.01); *G06F 9/30141* (2013.01); *G06F 9/3836* (2013.01); *G06F 9/4552* (2013.01)

(58) Field of Classification Search
CPC ...... G06F 15/16; G06F 15/80; G06F 9/30189; G06F 9/3885; G06F 9/3887; G06F 9/3889; G06F 9/3838; G06F 9/384; G06F 9/38; G06F 9/3814; G06F 9/3867; G06F 9/50; G06F 9/5016
(Continued)

(56) References Cited

U.S. PATENT DOCUMENTS 5,835,745 A   11/1998   Sager et al.
5,974,524 A   10/1999   Cheong et al.
(Continued)

OTHER PUBLICATIONS

Petit, Salvador, et al., "A Power-Aware Hybrid RAM-CAM Renaming Mechanism for Fast Recovery," IEEE International Conference on Computer Design, 2009, ICCD 2009, pp. 150-157, IEEE, Oct. 2009.
(Continued)

*Primary Examiner* — Keith Vicary
*Assistant Examiner* — Shawn Doman
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

Dynamic resource allocation is provided in which additional resources, such as additional architected registers, are provided to an instruction, if it is determined that resources in addition to those configured to be provided to the instruction are to be used for the particular instruction. An instruction to be executed is dispatched on a pipe of a pipeline and that pipe is configured to have a set number of architected registers for use by the instruction. However, if one or more other architected registers are needed, those additional architected registers are dynamically allocated to the instruction by assigning one or more source ports of an additional pipe to the instruction.

20 Claims, 10 Drawing Sheets

(58) Field of Classification Search
USPC .......................................................... 712/217
See application file for complete search history.

(56) References Cited

U.S. PATENT DOCUMENTS

| | | | | |
|---|---|---|---|---|
| 6,092,175 | A * | 7/2000 | Levy | .................. G06F 9/30076 |
| | | | | 712/215 |
| 6,144,982 | A * | 11/2000 | Panwar | .................. G06F 9/382 |
| | | | | 712/16 |
| 7,127,592 | B2 | 10/2006 | Abraham et al. | |
| 7,315,935 | B1 * | 1/2008 | Alsup | ................. G06F 9/30141 |
| | | | | 712/214 |
| 7,430,653 | B1 | 9/2008 | Tremblay | |
| 7,769,986 | B2 | 8/2010 | Abernathy et al. | |
| 7,809,930 | B2 | 10/2010 | Piry et al. | |
| 8,578,136 | B2 | 11/2013 | Piry et al. | |
| 2005/0091475 | A1 * | 4/2005 | Sodani | ................ G06F 9/30101 |
| | | | | 712/217 |
| 2013/0042004 | A1 * | 2/2013 | Boss | ..................... G06F 9/5061 |
| | | | | 709/226 |
| 2014/0195780 | A1 * | 7/2014 | Chaussade | ........... G06F 9/3867 |
| | | | | 712/29 |
| 2014/0351551 | A1 * | 11/2014 | Doerr | ................. G06F 12/0215 |
| | | | | 711/204 |

OTHER PUBLICATIONS

"z/Architecture—Principles of Operation," Publication No. SA22-7832-09, 10$^{th}$ Edition, Sep. 2012, pp. 1-1568.

Hennessy, John L et al., "Computer Architecture, Fifth Edition: A Quantitative Approach," Sep. 30, 2011, pp. 1-848.

* cited by examiner

DYNAMIC ASSIGNMENT ACROSS DISPATCH PIPES OF SOURCE PORTS TO BE USED TO OBTAIN INDICATION OF PHYSICAL REGISTERS

BACKGROUND

One or more aspects relate, in general, to processing within a computing environment, and in particular, to allocating resources to instructions processing within the computing environment.

In an implementation of high frequency out-of-order microprocessors, a mapping stage is supported that translates architected register addresses into physical register addresses. When an instruction needs to write an architected register, a mapper assigns an available physical register for that instruction to use. When a subsequent instruction needs to source that result, the physical location is read out of the mapper and passed onto the execution unit. In previous designs, the mapper was designed to have sufficient source look-up ports for each type of instruction to be executed.

SUMMARY

Shortcomings of the prior art are overcome and additional advantages are provided through the provision of a computer system for facilitating allocation of architected registers to instructions within a computing environment. The computer system includes a memory; and a processor in communications with the memory, wherein the computer system is configured to perform a method. The method includes, for instance, determining, by the processor, for an instruction, a number of architected registers to be used for the instruction; checking whether the number of architected registers to be used for the instruction is greater than a number of architected registers defined for a pipe on which the instruction is to be dispatched; and assigning a source port of an additional pipe to the instruction, based on the checking indicating the number of architected registers to be used for the instruction is greater than the number of architected registers defined for the pipe on which the instruction is to be dispatched, wherein based on assigning the source port, an additional architected register is available to the instruction.

Methods and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

In accordance with one or more aspects, a dynamic resource allocation capability is provided in which additional resources, such as additional architected registers, and thus, additional physical registers, are provided to an instruction, if it is determined that resources in addition to those configured to be provided to the instruction are to be used for the particular instruction. For instance, an instruction to be executed is dispatched on a pipe of a pipeline and that pipe is configured to have, e.g., three source look-up ports (also referred to herein as source ports) on which information for the instruction may be placed. This information includes, for instance, architected register addresses to be used by the instruction. A source port is used in accessing a register file to obtain a physical register address corresponding to an architected register address provided on the source port. Since there are three source ports defined for the pipe, there are up to three architected registers available for use by the instruction. However, if one or more other architected registers are needed, those additional architected registers are dynamically allocated to the instruction by assigning one or more source ports from another pipe that was to be assigned to another instruction.

Figure 1:
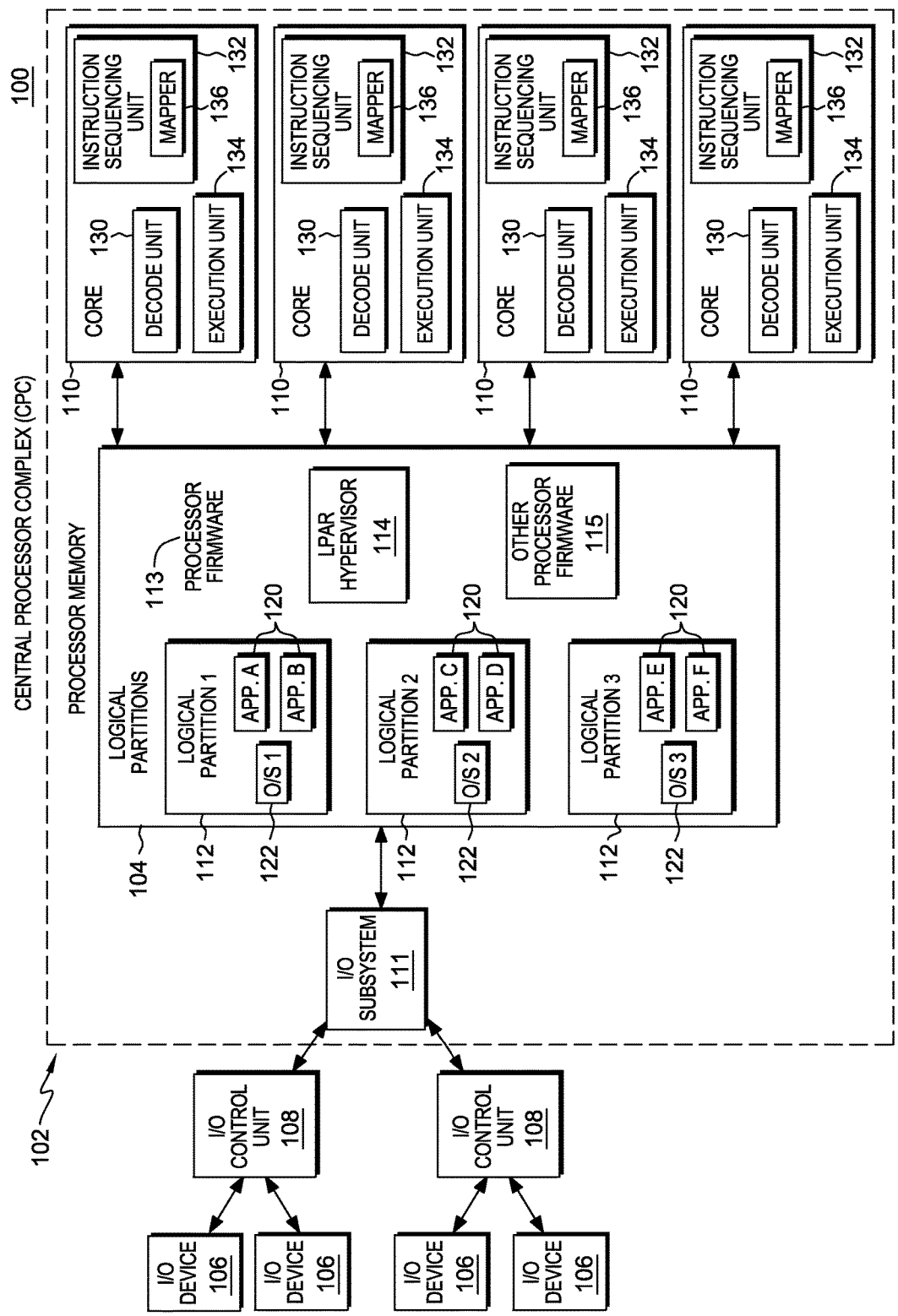
FIG. 1 depicts one example of a computing environment to incorporate and use one or more aspects of a dynamic allocation facility.

One example of a computing environment to incorporate and use one or more aspects of a dynamic allocation capability is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM® Publication entitled "z/Architecture—Principles of Operation," Publication No. SA22-7832-09, 10$^{th}$ Edition, September 2012, which is hereby incorporated by reference herein in its entirety.

Z/ARCHITECTURE, IBM, and Z/VM, Z/OS, POWER, and POWERPC (referenced herein) are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to one or more input/output (I/O) devices 106 via one or more control units 108. Central processor complex 102 includes, for instance, a processor memory 104 (a.k.a., main memory, main storage, central storage) coupled to one or more processor cores 110, and an input/output subsystem 111, each of which is described below.

Processor memory 104 includes, for example, one or more partitions 112 (e.g., logical partitions), and processor firmware 113, which includes, e.g., a logical partition hypervisor 114 and other processor firmware 115. One example of logical partition hypervisor 114 is the Processor Resource/System Manager (PR/SM), offered by International Business Machines Corporation, Armonk, N.Y.

A logical partition functions as a separate system and has one or more applications 120, and optionally, a resident operating system 122 therein, which may differ for each logical partition. In one embodiment, the operating system is the z/OS operating system, the z/VM operating system, the z/Linux operating system, or the TPF operating system, offered by International Business Machines Corporation, Armonk, N.Y.

Logical partitions 112 are managed by logical partition hypervisor 114, which is implemented by firmware running on cores 110. As used herein, firmware includes, e.g., the microcode and/or millicode of the processor core. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Processor cores 110 are physical processor resources allocated to the logical partitions. In particular, each logical partition 112 has one or more logical processors, each of which represents all or a share of a core 110 allocated to the partition. The logical processors of a particular partition 112 may be either dedicated to the partition, so that the underlying core resource 110 is reserved for that partition; or shared with another partition, so that the underlying core resource is potentially available to another partition.

In one example, each core 110 includes a plurality of processing units, such as a decode unit 130 used to decode instructions received on an instruction pipeline and group those instructions; an instruction sequencing unit 132 to dispatch and issue the instructions; and an execution unit 134 to execute the instructions. In one embodiment, instruction sequencing unit 132 includes a mapper 136 used to allocate physical registers to architected registers, in accordance with one or more aspects.

Input/output subsystem 111 directs the flow of information between input/output devices 106 and main storage 104. It is coupled to the central processing complex, in that it can be a part of the central processing complex or separate therefrom. The I/O subsystem relieves the processor cores of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 106. In this particular example, these paths are called channel paths, since the communication adapters are channels.

Figure 2:
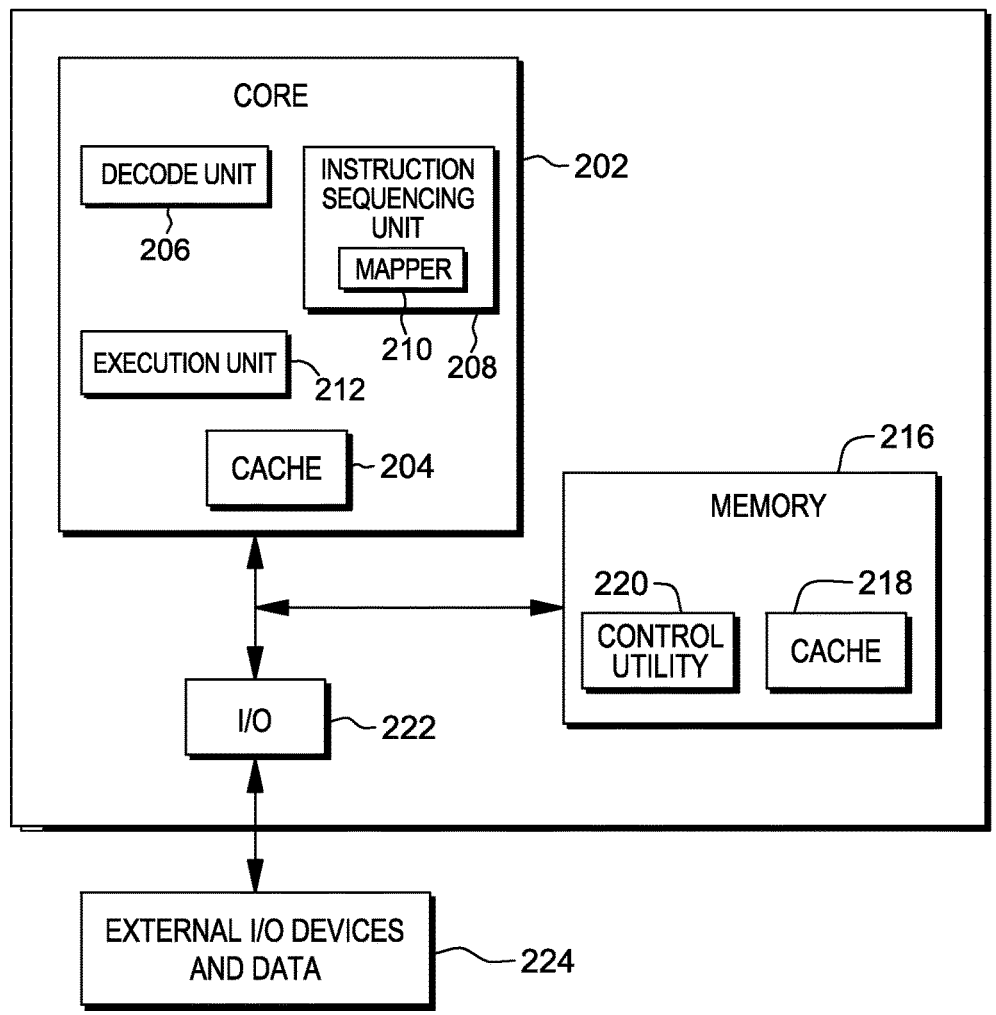
FIG. 2 depicts another example of a computing environment to incorporate and use one or more aspects of a dynamic allocation facility.

Another example of a computing environment to incorporate and use one or more aspects of a dynamic allocation capability is described with reference to FIG. 2. In this example, a computing environment 200 includes a non-partitioned environment implemented based on the z/Architecture (or another architecture in another embodiment). It includes a core 202 that includes, for instance, one or more caches 204; a decode unit 206; an instruction sequencing unit 208, including a mapper 210; and an execution unit 212.

Core 202 is communicatively coupled to a memory 216 having one or more caches 218 and at least one control utility 220, such as an operating system; and to an input/output (I/O) subsystem 222. I/O subsystem 222 is communicatively coupled to external I/O devices 224 that may include, for example, data input devices, sensors and/or output devices, such as displays.

Figure 3A:
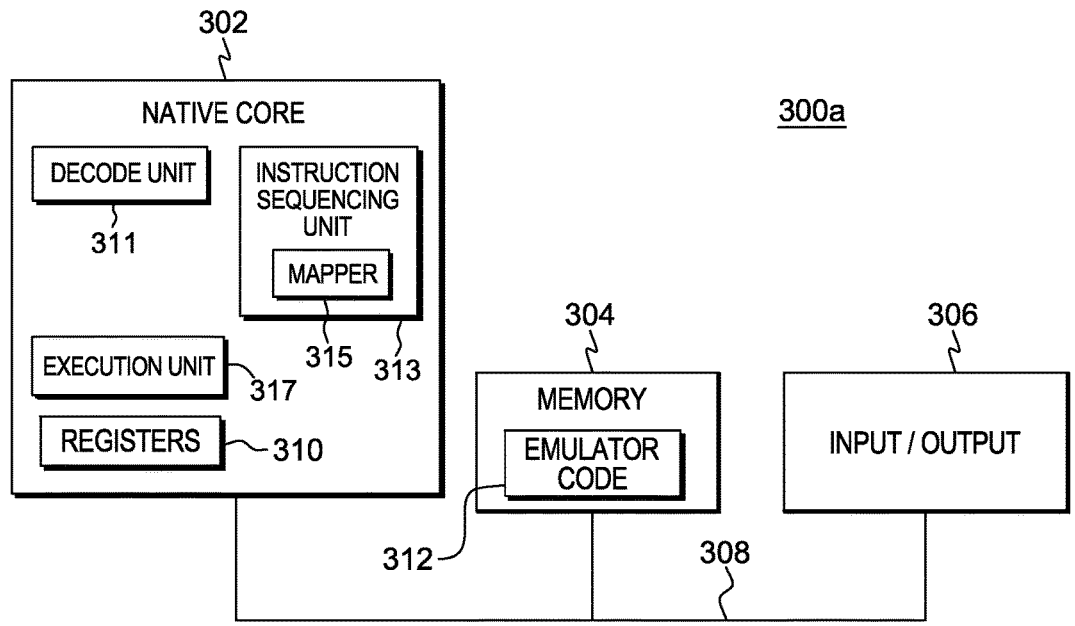
FIG. 3A depicts yet another example of a computing environment to incorporate and use one or more aspects of a dynamic allocation facility.

Another embodiment of a computing environment to incorporate and use one or more aspects of a dynamic allocation capability is described with reference to FIG. 3A. In this example, a computing environment 300a includes, for instance, at least one native core 302, a memory 304, and one or more input/output devices and/or interfaces 306 coupled to one another via, for example, one or more buses 308 and/or other connections. As examples, computing environment 300a may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Each native core 302 of the at least one native core includes one or more native registers 310, such as one or more general purpose registers and/or one or more special purpose registers used during processing within the environment that include information that represents the state of the environment at any particular point in time. Further, native core 302 may include a decode unit 311; an instruction sequencing unit 313 having a mapper 315; and an execution unit 317.

Moreover, each native core 302 executes instructions and code that are stored in memory 304. In one particular example, the processor core executes emulator code 312 stored in memory 304. This code enables the computing environment configured in one architecture to emulate one or more other architectures. For instance, emulator code 312 allows machines based on architectures other than the z/Architecture, such as PowerPC processors, Power Systems servers, HP Superdome servers or others, to emulate the z/Architecture and to execute software and instructions developed based on the z/Architecture.

Figure 3B:
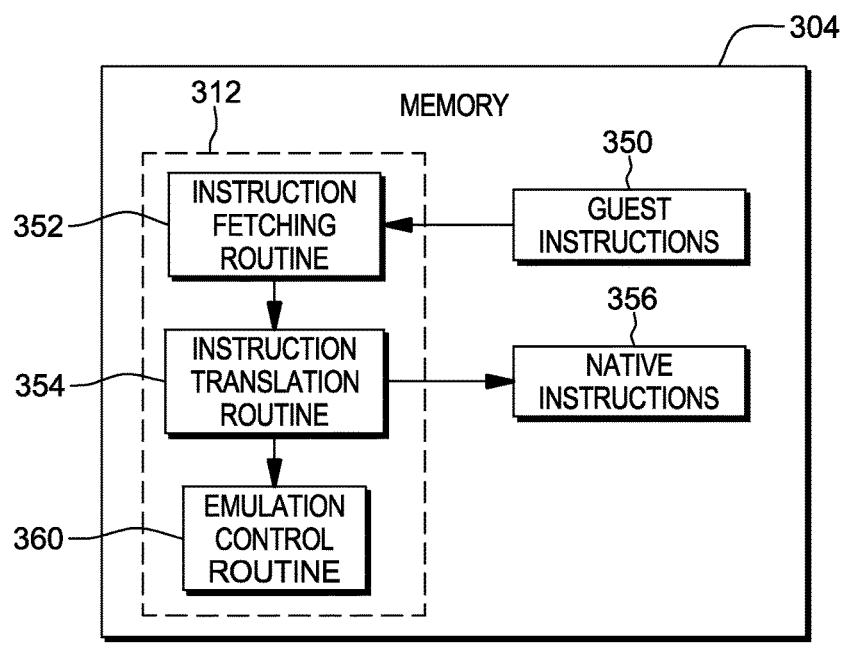
FIG. 3B depicts further details of a memory of the computing environment of FIG. 3A.
Figure 3C:
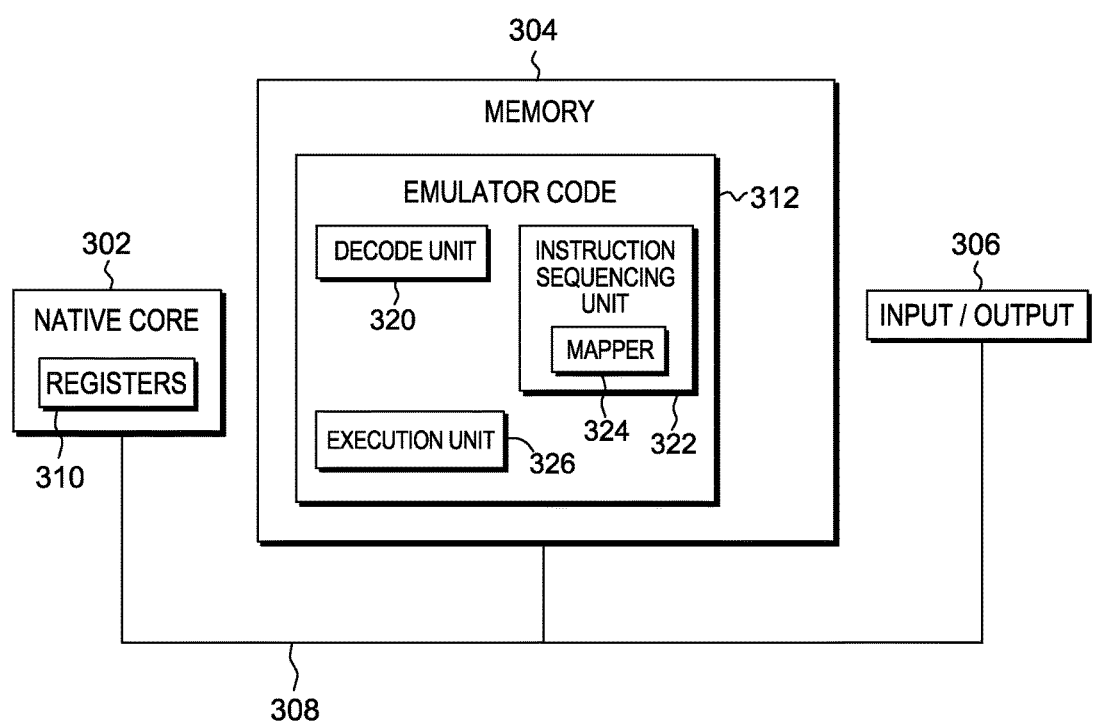
FIG. 3C depicts a further example of a computing environment to incorporate and use one or more aspects of a dynamic allocation facility.

In a further embodiment, as shown in FIG. 3C, the decode unit, the instruction sequencing unit and/or the execution unit are being emulated, and therefore, emulator code 312 of computing environment 300b includes a decode unit 320, an instruction sequencing unit 322 having a mapper 324, and an execution unit 326, each of which is based on an architecture different from the architecture of native core 302, such as the z/Architecture.

Further details relating to emulator code 312 are described with reference to FIG. 3B. Guest instructions 350 stored in memory 304 comprise software instructions (e.g., correlating to machine instructions) that were developed to be executed in an architecture other than that of native core 302. For example, guest instructions 350 may have been designed to execute on a z/Architecture core 202, but instead, are being emulated on native core 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native core 302 to execute a routine of native instructions that emulate one or more previously obtained guest instructions and, at the conclusion of such execution, return control to the instruction fetch routine to emulate the obtaining of the next guest instruction or a group of guest instructions. The guest instructions may be instructions of the dynamic allocation facility described herein. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native core 302. In other examples, one or more of the routines or operations are implemented in firmware, hardware, software or some combination thereof. The registers of the emulated processor may be emulated using registers 310 of the native core or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Figure 4:
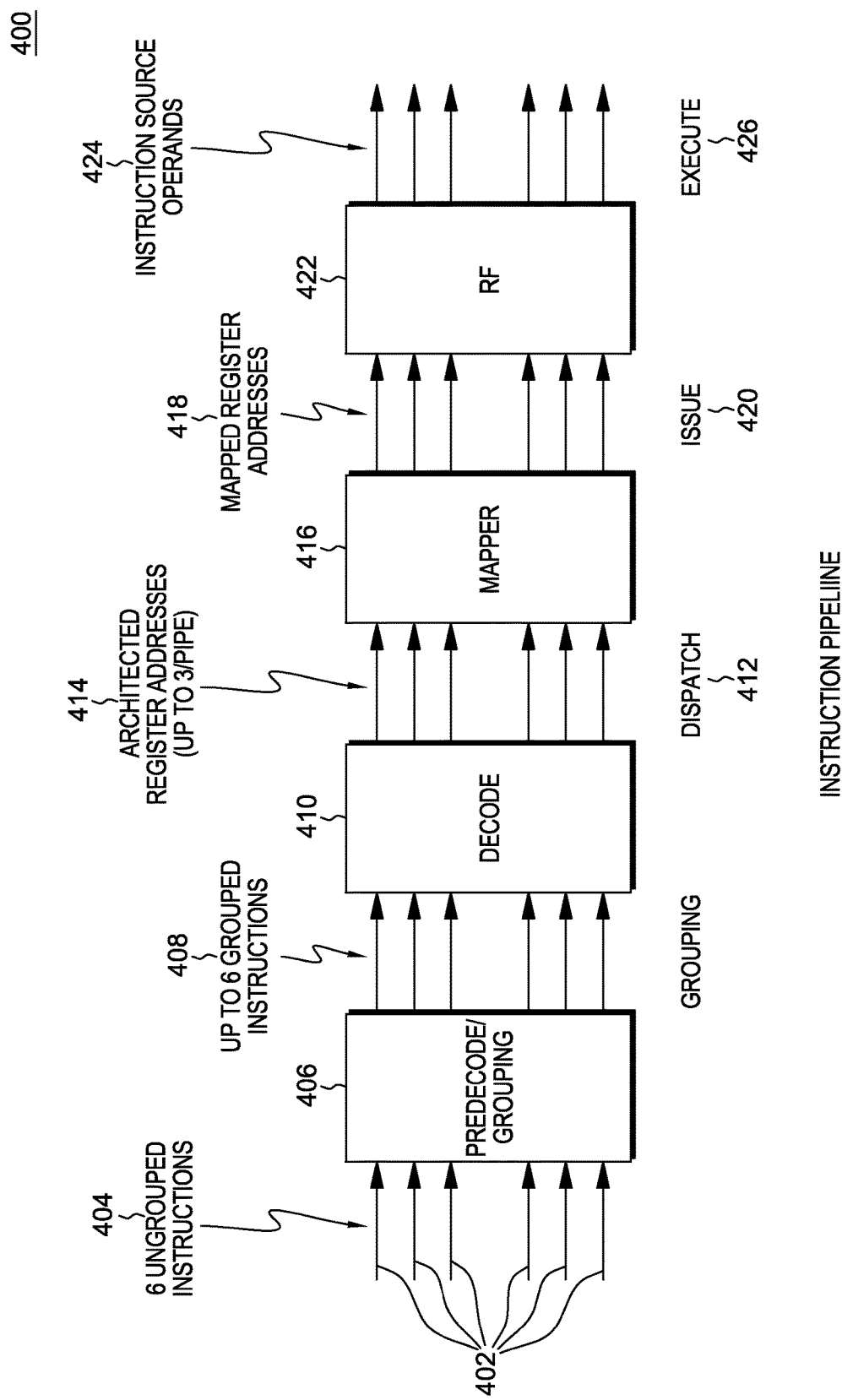
FIG. 4 depicts one example of an instruction pipeline.

In one embodiment, instructions are executed via an instruction pipeline. One example of an instruction pipeline 400 is described with reference to FIG. 4. In this particular example, the pipeline is a six-wide instruction pipeline having six pipes 402 that accommodate up to two groups of 1-3 instructions. Initially, six ungrouped instructions 404 are traveling through the pipeline, and are input to predecode/grouping logic 406. This logic determines which instructions can be dispatched together in a group. The output of predecode/grouping logic 406 is up to 6 grouped instructions 408 (e.g., 2 groups of 3 instructions). The groups are passed to decode logic 410, which calculates information used by the mapper or execution units. In one example, predecode/grouping logic 406 and decode logic 410 are in the decode unit of the core. However, in other examples, they may be in separate or different units.

The decoded instructions are dispatched 412 to the instruction sequencing unit, and in particular, to a mapper 416 of the instruction sequencing unit. Mapper 416 includes or has access to a register file of physical register addresses, and is used to assign physical register addresses to architected register addresses used by the instructions. Each instruction on the pipe is assigned up to three architected register addresses 414 depending on the instruction text, such as the number of operands associated with the instruction. The architected register addresses are input into mapper 416, which maps physical register addresses 418 to the architected register addresses. The instructions with the physical register addresses are then broadcast in an issue stage 420 to execution units 426. During execution, register file 422 is accessed to obtain instruction operands 424 using the physical addresses from the mapper.

Figure 5A:
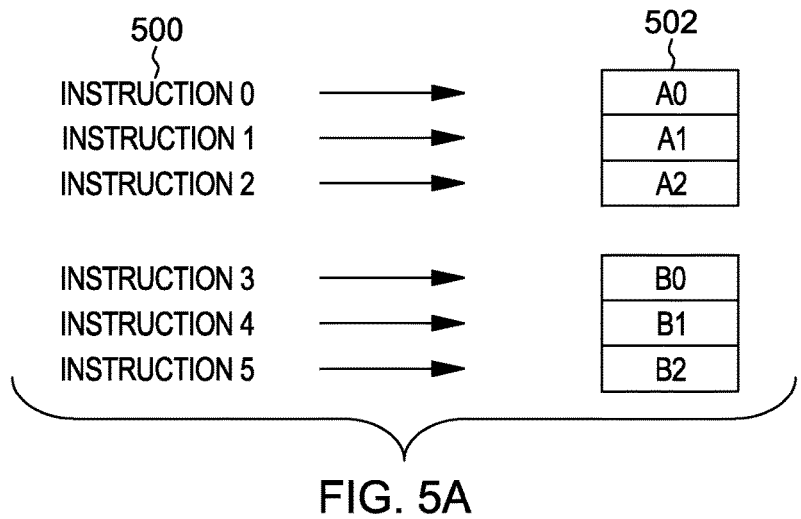
FIG. 5A depicts one example of an assignment of instructions to pipes.
Figure 5B:
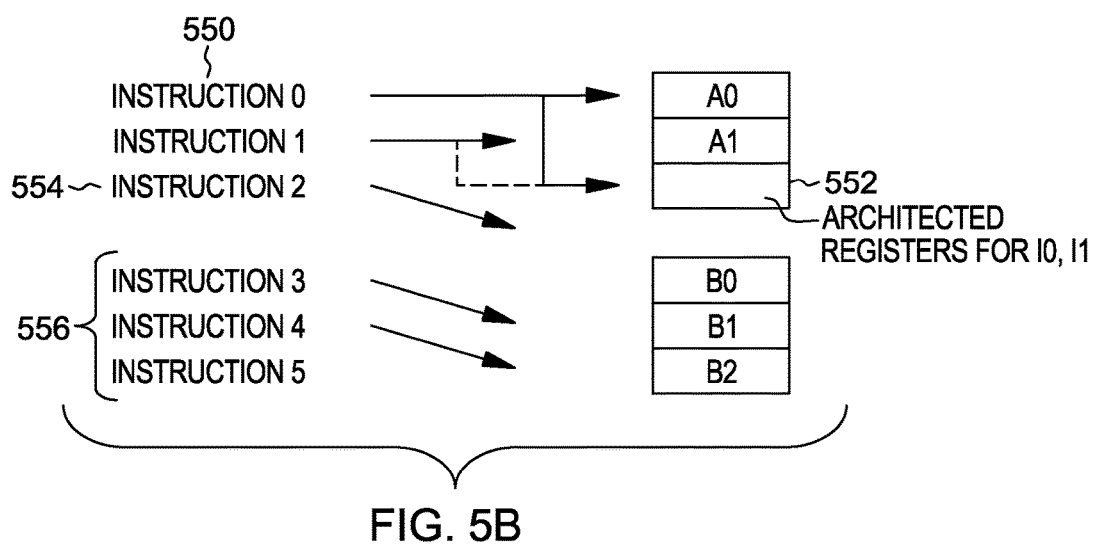
FIG. 5B depicts another example of an assignment of instructions to pipes.

As indicated above, in one example, each pipe is configured for up to three architected registers; i.e., each pipe has three source look-up ports. However, at times, an instruction on a pipe may need more than the configured number of registers. Since each pipe only has the configured number of registers, if another register is needed, then a source port of another pipe is assigned to the instruction, in accordance with one or more aspects. For instance, as shown in FIG. 5A, each instruction 500 is assigned a pipe 502, and therefore, has, e.g., three source ports assigned thereto, allowing for up to three architected registers to be available for the instruction. In this example, none of the instructions need more than the configured number of architected registers. However, in FIG. 5B, it is shown that Instruction 0 (550) needs more than the configured number of architected registers. Therefore, a portion of pipe 2 (552) is also assigned to Instruction 0 (I0). This portion includes a source look-up port of pipe 2 providing an additional architected register to Instruction 0. Other portions of pipe 2 (e.g., other source look-up ports) may be reserved for other instructions or to provide even more resources to Instruction 0. For instance, as shown by the dotted line in FIG. 5B, Instruction 1 (I1) may also be assigned a source port of pipe two. Thus, both Instruction 0 and Instruction 1 forward to pipe 2 an architected register needed for those instructions.

In a further embodiment, Instruction 0 may need more than one additional architected register. For instance, it may need two additional architected registers. Thus, in this example, two source look-up ports of pipe 2 are assigned to Instruction 0. Thus, in accordance with one or more aspects, a subsequent pipe may be partitioned in that one or more source look-up ports of the pipe may be assigned to one or more previously dispatched instructions.

The use of a portion of pipe 2 for another instruction impacts the grouping of instructions, since there is no longer a pipe for Instruction 2 in the first group of dispatch pipes. Therefore, in one embodiment, Instruction 2 (554) is moved to another dispatch group of instructions 556. That group also includes Instructions 3 and 4, and Instruction 5 will have to wait to be dispatched at a later time.

By allocating source look-up ports of another pipe to the instruction, one or more (up to 3, in this example) additional architected registers may be assigned to the instruction. The mapper then provides physical addresses for the architected registers.

One embodiment of logic to dynamically allocate additional resources, such as additional registers, to one or more instructions is described with reference to FIGS. 6A-6B. The logic of FIG. 6A is performed by, for instance, the decode unit, and the logic of FIG. 6B is performed by, for instance, the instruction sequencing unit.

Figure 6A:
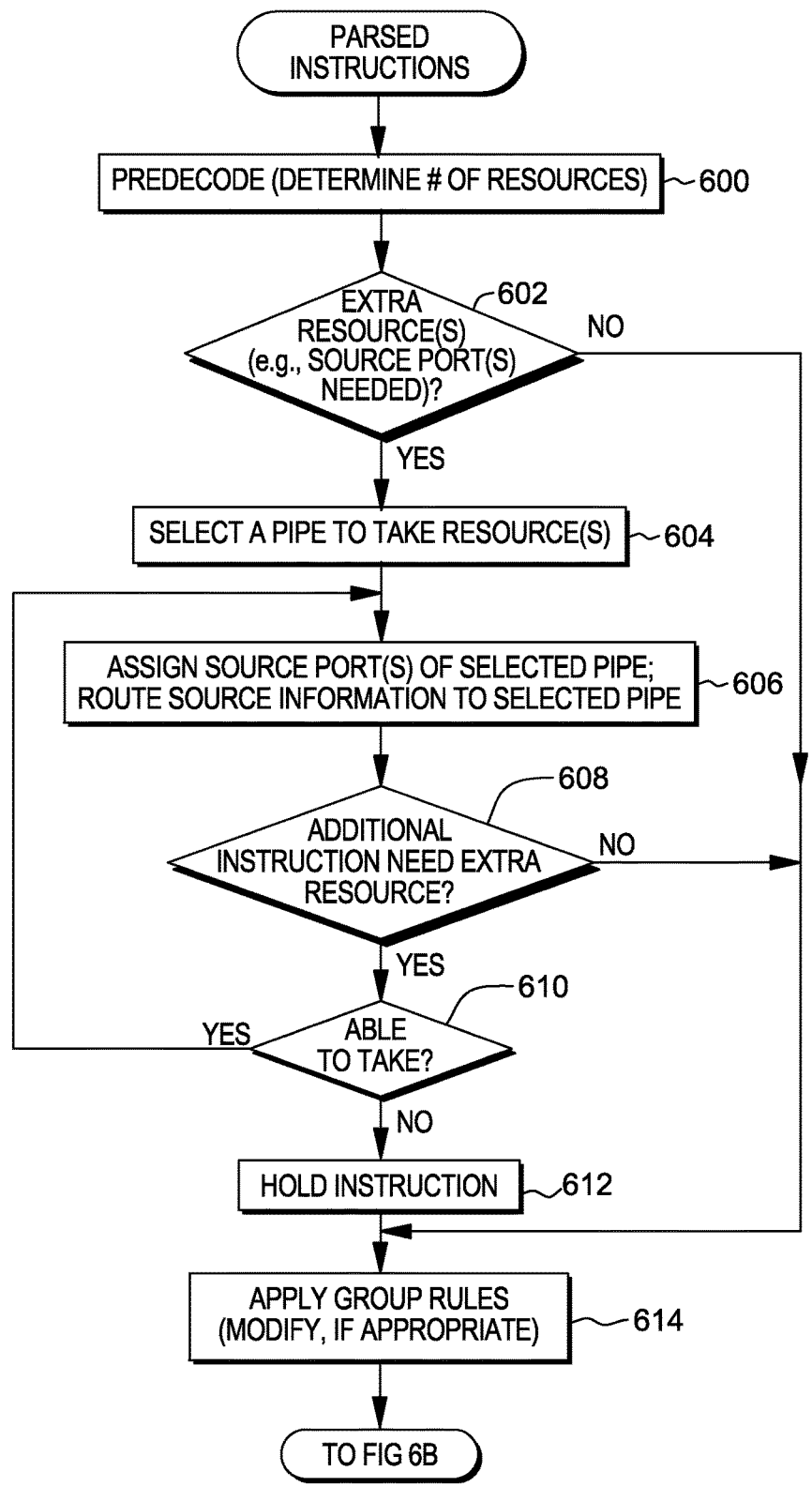
FIGS. 6A-6B depict one embodiment of logic to dynamically assign physical register addresses to architected register addresses.
Figure 6B:
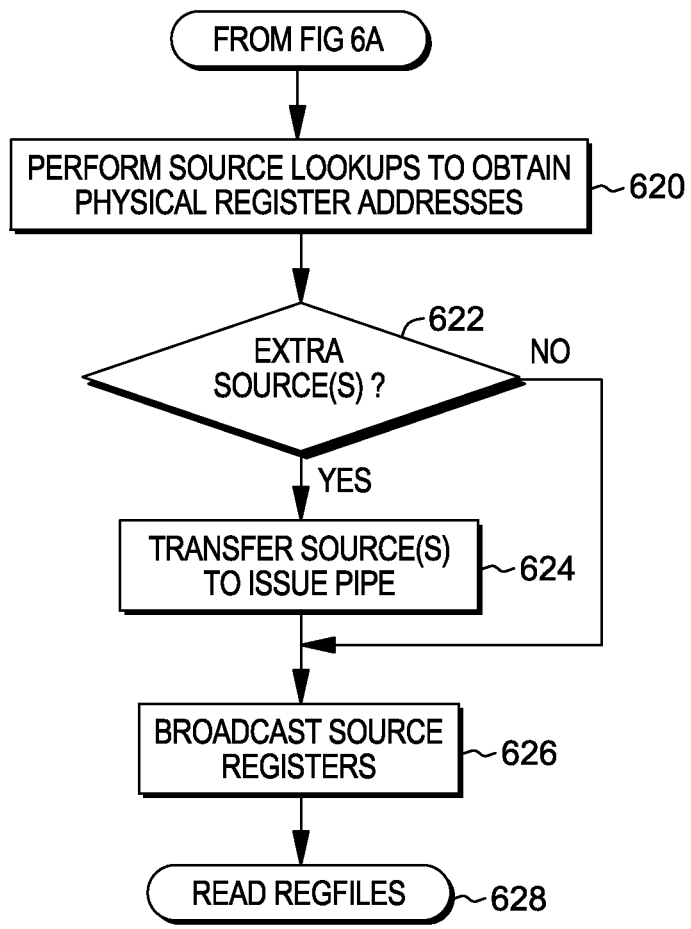

Referring initially to FIG. 6A, a plurality of parsed instructions (e.g., 6 instructions) in the pipeline is input to the predecode logic, which is used to decode the instructions to obtain information to group the plurality of instructions into, for instance, two groups, STEP 600. The predecode logic takes into consideration whether one or more of the instructions needs more than the configured number of architected registers. This is based on, for instance, the text of the instruction, such as the number of operands used by the instruction. If an instruction needs more than the configured number of architected registers, then less instructions are grouped into the group, since source look-up ports of more than one pipe will be assigned to the instruction. Typically, only source look-up ports of one additional pipe are assigned, but it is possible that source look-up ports of two additional pipes could be assigned. In this example, the assignment of source look-up ports of additional pipes does not go across group boundaries, but in another example, it may.

A determination is made as to whether an instruction of the plurality of instructions is in need of additional resources, e.g., one or more registers above and beyond the number of registers configured for the pipe on which the instruction is being processed, INQUIRY 602. If the instruction is in need of one or more additional registers, then a pipe in the dispatch group of pipes in which this instruction is assigned is selected as a pipe from which resources are to be taken, STEP 604. For example, pipe 2 is selected as the pipe from which resources are to be taken, and one or more source ports of pipe 2 are assigned to the instruction depending on the number of additional resources needed by the instruction, STEP 606.

Source information of the instruction (e.g., an indication of the one or more architected registers needed by the instruction) is routed to the selected pipe and included in one or more source ports of the pipe, STEP 606. For instance, if only one extra architected register is needed, then source information is included on one source look-up port of the selected pipe. However, if, for instance, two additional architected registers are needed, then source information is included on two source look-up ports of the selected pipe. Other possibilities also exist.

Thereafter, a determination is made as to whether an additional instruction of the dispatch group is in need of extra resources, INQUIRY 608. If so, then a check is made as to whether there is a pipe in the dispatch group from which resources may be taken, INQUIRY 610. If there are source look-up ports on, for instance, the selected pipe that may be taken, then processing continues to STEP 606. In this example, it is assumed that the same selected pipe is used to obtain additional resources; however, in another embodiment, another pipe may be selected. However, if there are no additional resources that may be taken, then that instruction is, for example, held for dispatching in another group, STEP 612.

Subsequently, or if no extra resources are needed, INQUIRY 602 or INQUIRY 608, then grouping is performed using predefined grouping rules, STEP 614. In one example, if additional resources were assigned to one or more instructions, then the predefined grouping rules are modified to ensure that an instruction is not dispatched on the selected pipe being used for additional resources.

After grouping the instructions, the instructions are dispatched and sent over to the instruction sequencing unit. Referring to FIG. 6B, the mapper of the instruction sequencing unit performs source lookups, STEP 620. That is, the mapper takes the addresses of the architected registers that are on the source ports and inputs those addresses into a register file and obtains therefrom addresses of physical registers to be used by the instruction.

Thereafter, the instruction sequencing unit checks whether one or more extra sources (e.g., extra registers) were needed, INQUIRY 622. This check is based on input to the instruction sequencing unit or based on a value in memory, etc. If one or more extra sources were needed, then the one or more sources (e.g., the physical addresses) are transferred to the issue pipe on which the instruction is executing, STEP 624. That is, the register address associated with the source port of pipe 2 is passed to the initial pipe of the instruction, so that the instruction has all of the needed sources. Thereafter, or if an extra source is not needed, INQUIRY 622, the source registers are broadcast to one or more execution units, STEP 626. The register files are read in the execution unit using the physical addresses, STEP 628.

Figure 7:
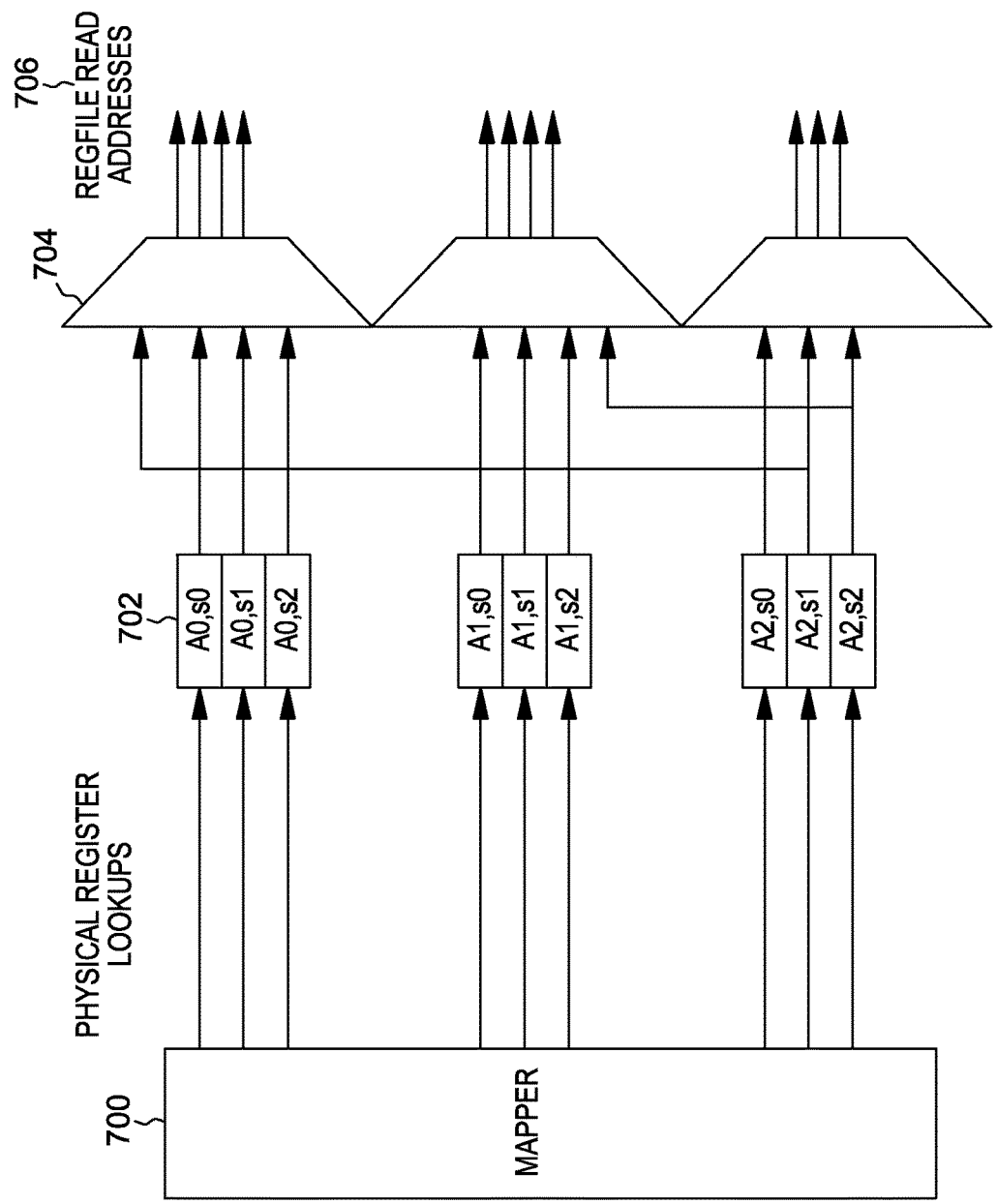
FIG. 7 depicts one embodiment of multiplexing used in accordance with one or more aspects.

Further details regarding transferring the additional register address to the instruction are described with reference to FIG. 7. As shown, mapper 700 provides physical addresses to instructions 702. A multiplexor 704 is used to provide the additional source or sources, if any, to the appropriate instruction. The physical addresses are then used in execution to read the register file 706.

As described herein, in a high frequency out-of-order microprocessor, a mapping stage is supported that translates architected register addresses into physical register addresses. When an instruction needs to write an architected register, the mapper assigns an available physical register for that instruction to use. When a subsequent instruction needs to source that result, the physical location is read out of the mapper and passed onto the execution unit.

In one example, each dispatch pipe only performs three source look-ups. This presents a problem where a fourth look-up (or more) is needed. Thus, in accordance with one aspect, the mapper is able to dynamically allocate additional source look-ups from subsequent pipes to preceding dispatches.

The source taking function begins, for example, at predecode time. The predecodes are responsible for determining how to group instructions together. In this implementation, anywhere from 1 to 3 instructions can occupy a single dispatch group (so there are two dispatch groups per cycle, in this example). A determination is made as to how many sources the predecoding instructions require. If all 6 predecoding instructions are simple and do not require more than 3 sources, they pass through the grouping stage and are dispatched together. If, however, either of the first two instructions require a fourth source (or more), the grouping logic will not include a third instruction in the dispatch group. Instead, that instruction will be bumped to the next dispatch group.

During the decode stage, the architected registers are calculated. If source taking is necessary, the appropriate instruction text (e.g., architected register portion) from dispatch pipe 0 or dispatch pipe 1 (or both as the case may require) is routed to dispatch pipe 2. This instruction text (e.g., architected register portion) is used to calculate, for instance, the fourth source. In addition, the multiplexor selects for the mapper are calculated. These selects effectively tell the mapper that dispatch pipe 0 or dispatch pipe 1 is to take a source look-up from another dispatch pipe, e.g., dispatch pipe 2.

This information is subsequently dispatched and shipped off to the mapper. Any architected registers that have been routed from pipe 0 or pipe 1 to pipe 2 are read using pipe 2's mapper read ports. The multiplexor selects, identified above, route the mapped register addresses back to the appropriate issue pipes so that at issue time, the instructions that need a fourth source have the data they need to correctly access their regfiles and execute their instructions.

As used herein, storage, central storage, main storage, memory and main memory are used interchangeably, unless otherwise noted, implicitly by usage or explicitly.

Figure 8:
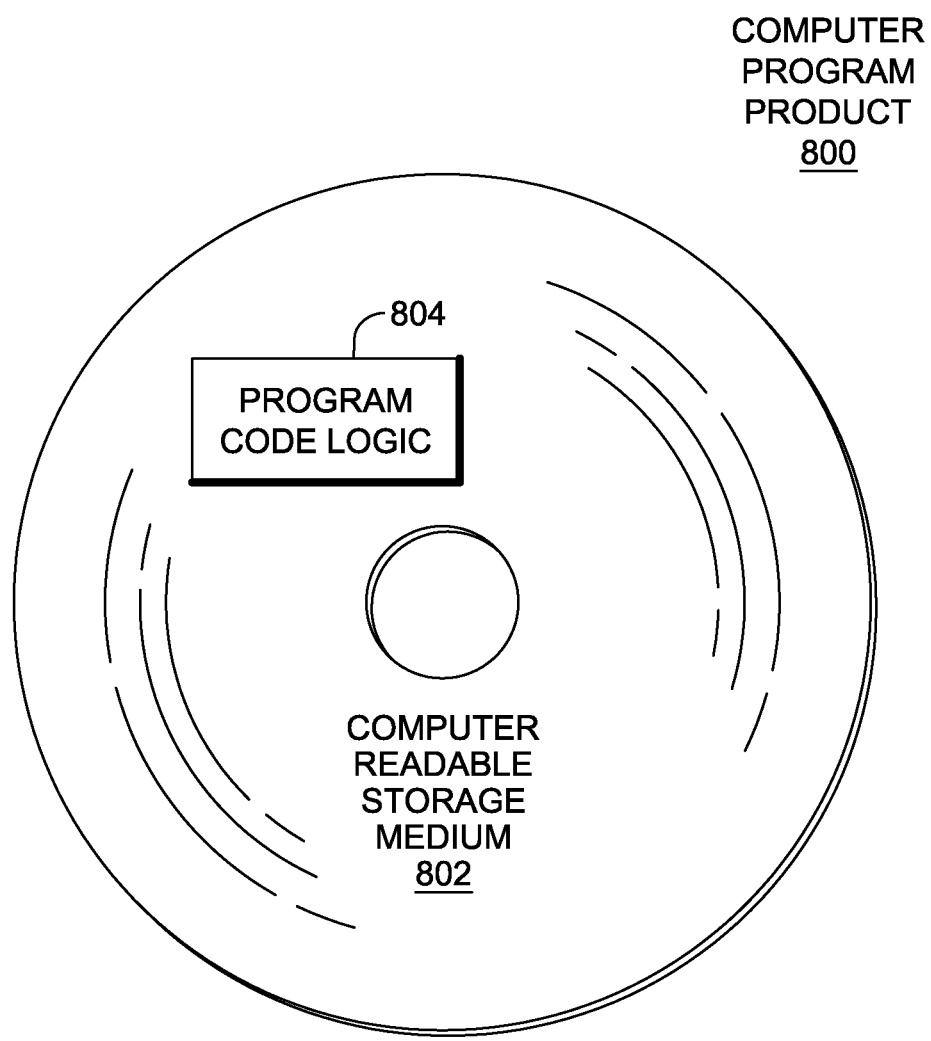
FIG. 8 depicts one embodiment of a computer program product incorporating one or more aspects.

Referring to FIG. 8, in one example, a computer program product 800 includes, for instance, one or more non-transitory computer readable storage media 802 to store computer readable program code means, logic and/or instructions 804 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different stages of an instruction pipeline, different grouping of instructions, including the number of groups and/or the number of instructions in groups and/or different number of sources, etc. may be accommodated. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer system for facilitating allocation of architected registers to instructions executing within a computing environment, said computer system comprising:
   a memory; and
   a processor in communication with the memory, wherein the computer system is configured to perform a method, said method comprising:
      determining, by the processor, for an instruction, a number of architected registers to be used for the instruction;
      checking whether the number of architected registers to be used for the instruction is greater than a number of architected registers defined for a pipe on which the instruction is to be dispatched, the pipe being of a pipeline and configured to have one or more source ports on which information for the instruction may be placed, the information including an indication of one or more architected registers to be used by the instruction;
      assigning a source port of an additional pipe to the instruction, based on the checking indicating the number of architected registers to be used for the instruction is greater than the number of architected registers defined for the pipe on which the instruction is to be dispatched, wherein based on assigning the source port, an additional architected register is available to the instruction, the source port to be used to obtain an indication of a physical register corresponding to the additional architected register;
      routing source information of the instruction to the additional pipe, based on assigning the source port of the additional pipe to the instruction; and
      including, based on the routing, the source information in the source port of the additional pipe assigned to the instruction.

2. The computer system of claim 1, wherein the method further comprises determining, for the number of architected registers to be used for the instruction, a number of physical register addresses to be used in execution of the instruction.

3. The computer system of claim 2, wherein the method further comprises providing the number of physical register addresses to the instruction.

4. The computer system of claim 3, wherein the providing the number of physical register addresses to the instruction comprises using a multiplexor to transfer the physical register address of the additional architected register from the additional pipe to the pipe on which the instruction is to be dispatched.

5. The computer system of claim 1, wherein the assigning comprises assigning a plurality of source ports to the instruction to provide a plurality of additional architected registers to the instruction.

6. The computer system of claim 1, wherein the method further comprises grouping a plurality of instructions into a plurality of groups, wherein a group of the plurality of groups includes the instruction, and wherein the group includes one less instruction to accommodate information of the instruction on the additional pipe to obtain the additional architected register.

7. The computer system of claim 1, wherein the source information includes an identified architected register for the instruction.

8. The computer system of claim 1, wherein the determining the number of architected registers comprises using instruction text of the instruction to determine the number of architected registers.

9. The computer system of claim 1, wherein the number of architected registers defined for the pipe comprises three.

10. The computer system of claim 1, wherein the assigning is performed dynamically based on the checking indicating the number of architected registers to be used for the instruction is greater than the number of architected registers defined for the pipe.

11. A computer program product for facilitating allocation of architected registers to instructions executing within a computing environment, said computer program product comprising:

a computer readable storage medium readable by a processing circuit and storing instructions for execution by the processing circuit for performing a method comprising:

determining, by a processor, for an instruction, a number of architected registers to be used for the instruction;

checking whether the number of architected registers to be used for the instruction is greater than a number of architected registers defined for a pipe on which the instruction is to be dispatched, the pipe being of a pipeline and configured to have one or more source ports on which information for the instruction may be placed, the information including an indication of one or more architected registers to be used by the instruction;

assigning a source port of an additional pipe to the instruction, based on the checking indicating the number of architected registers to be used for the instruction is greater than the number of architected registers defined for the pipe on which the instruction is to be dispatched, wherein based on assigning the source port, an additional architected register is available to the instruction, the source port to be used to obtain an indication of a physical register corresponding to the additional architected register;

routing source information of the instruction to the additional pipe, based on assigning the source port of the additional pipe to the instruction; and including, based on the routing, the source information in the source port of the additional pipe assigned to the instruction.

12. The computer program product of claim 11, wherein the method further comprises:

determining, for the number of architected registers to be used for the instruction, a number of physical register addresses to be used in execution of the instruction; and providing the number of physical register addresses to the instruction.

13. The computer program product of claim 12, wherein the providing the number of physical register addresses to the instruction comprises using a multiplexor to transfer the physical register address of the additional architected register from the additional pipe to the pipe on which the instruction is to be dispatched.

14. The computer program product of claim 11, wherein the method further comprises grouping a plurality of instructions into a plurality of groups, wherein a group of the plurality of groups includes the instruction, and wherein the group includes one less instruction to accommodate information of the instruction on the additional pipe to obtain the additional architected register.

15. The computer program product of claim 11, wherein the source information includes an identified architected register for the instruction.

16. A method of facilitating allocation of architected registers to instructions executing within a computing environment, said method comprising:

determining, by a processor, for an instruction, a number of architected registers to be used for the instruction;

checking whether the number of architected registers to be used for the instruction is greater than a number of architected registers defined for a pipe on which the instruction is to be dispatched, the pipe being of a pipeline and configured to have one or more source ports on which information for the instruction may be placed, the information including an indication of one or more architected registers to be used by the instruction;

assigning a source port of an additional pipe to the instruction, based on the checking indicating the number of architected registers to be used for the instruction is greater than the number of architected registers defined for the pipe on which the instruction is to be dispatched, wherein based on assigning the source port, an additional architected register is available to the instruction, the source port to be used to obtain an indication of a physical register corresponding to the additional architected register;

routing source information of the instruction to the additional pipe, based on assigning the source port of the additional pipe to the instruction; and including, based on the routing, the source information in the source port of the additional pipe assigned to the instruction.

17. The method of claim 16, further comprising:

determining, for the number of architected registers to be used for the instruction, a number of physical register addresses to be used in execution of the instruction; and providing the number of physical register addresses to the instruction.

18. The method of claim 17, wherein the providing the number of physical register addresses to the instruction comprises using a multiplexor to transfer the physical register address of the additional architected register from the additional pipe to the pipe on which the instruction is to be dispatched.

19. The method of claim 16, further comprising grouping a plurality of instructions into a plurality of groups, wherein a group of the plurality of groups includes the instruction, and wherein the group includes one less instruction to accommodate information of the instruction on the additional pipe to obtain the additional architected register.

20. The method of claim 16, the source information includes an identified architected register for the instruction.

* * * * *